July 4, 1950 — I. B. PRETTYMAN ET AL — 2,514,202

METHOD AND APPARATUS FOR TESTING TIRE TREAD CRACKING

Filed Dec. 28, 1944 — 4 Sheets-Sheet 1

Inventors
IRVEN B. PRETTYMAN
AND
HANS G. HAGER

July 4, 1950  I. B. PRETTYMAN ET AL  2,514,202
METHOD AND APPARATUS FOR TESTING TIRE TREAD CRACKING
Filed Dec. 28, 1944  4 Sheets-Sheet 3

Inventors
IRVEN B. PRETTYMAN
AND
HANS G. HAGER

By
Attorneys

July 4, 1950     I. B. PRETTYMAN ET AL     2,514,202
METHOD AND APPARATUS FOR TESTING TIRE TREAD CRACKING
Filed Dec. 28, 1944     4 Sheets-Sheet 4
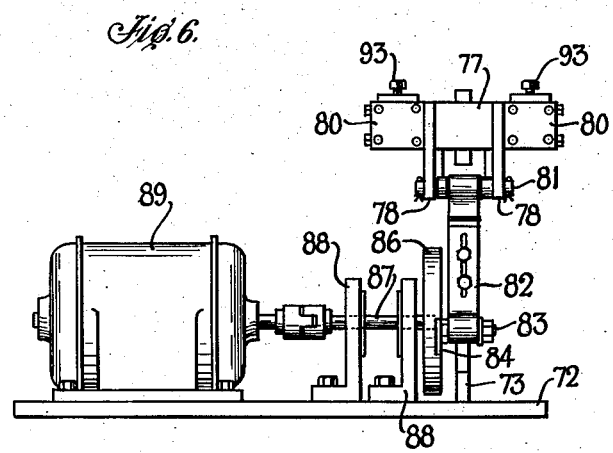
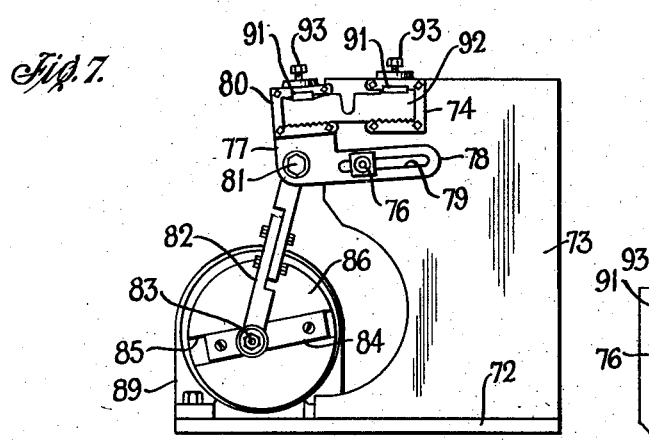
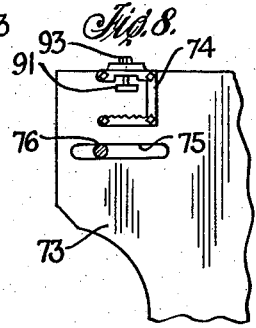
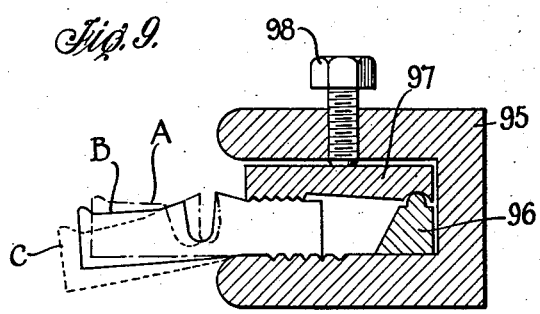
Inventors
IRVEN B. PRETTYMAN
AND
HANS G. HAGER
By
Attorneys Patented July 4, 1950

2,514,202

UNITED STATES PATENT OFFICE 2,514,202

METHOD AND APPARATUS FOR TESTING TIRE TREAD CRACKING

Irven B. Prettyman and Hans G. Hager, Akron, Ohio, assignors to The Firestone Tire & Rubber Company, Akron, Ohio, a corporation of Ohio Application December 28, 1944, Serial No. 570,500

9 Claims. (Cl. 73—100)

This invention relates to testing apparatus, and more especially it relates to method and apparatus adapted to evaluate the groove-cracking resistance of various natural and/or synthetic rubber compositions used in the manufacture of the tread portions of pneumatic tire casings.

The apparatus is adaptable to the study of either crack initiation, crack growth, or combined crack initiation and growth.

The development of cracks in the bottom or base of the tread grooves of pneumatic tire casings has long been recognized as a major factor governing the useful life of the tires. Numerous laboratory tests have been employed heretofore in an effort to evaluate crack initiation and growth; for example, rubber strips of dumbbell-shape, rubber rings, and grooved blocks have been flexed through various tension cycles; grooved belts and tire treads have been fixed by weaving over pulleys and thereby producing a cycle which involves both tension and compression, and tires themeslves have been flexed under load on rotating drums. None of the foregoing tests has proved entirely satisfactory, and it is to the improvement of apparatus for performing such tests that this invention primarily is directed.

The strains that produce cracking along the length of a tire groove are complex. They occur on or near the surface in the bottom or base of the groove. They may be defined as the strains at right angles to the groove length and in the plane of the groove base. In the devising of a testing apparatus that reproduces these strains qualitatively, the forces acting to produce the strains must be considered.

The force acting upward on the ribs of a tire tread in the region thereof that is in contact with the ground bends the tread to an extent determined primarily by the load on the tire, the inflation pressure, the molded tire shape, and the structure of the fabric carcass of the tire. This bending is concentrated to a large extent in the groove base, with its magnitude substantially independent of the speed of the tire and of the tread stock used; and a compression strain of constant amplitude is produced. This upward force also deforms the ribs and thus contributes a slight additional compressive strain of the constant force type. This produces little difference in the compression strains between different stocks, especially since all normal tire treads have moduli in the same general range. Experiment has shown that there are compression strains of the order of 30% in the base of the grooves of passenger car tires under static load.

When a tire tread leaves the road surface, tension is introduced as the result of the bending caused by centrifugal force. Thus the rubber in the base of the groove passes from compression, through zero strain, into tension. An additional tension probably is introduced by the outward displacement of the tread, observed as a bulge noticeable at high speeds at a point immediately adjacent the ground-contact area of the tire at the receding side of the said area. In neither case is this tension dependent to any significant extent on the composition of the tread stock although it increases with increase of tire speed. Thus for any given tire speed, it may be considered to be of the constant amplitude type. The predominance of the constant amplitude type of strains justifies the use of a constant amplitude flexing test for laboratory evaluation.

The addition of compression and zero strain to tension in the flexing cycle of tread stocks affects the flexing resistance, which indicates the desirability of their inclusion in a laboratory evaluation test. The compression phase of the cycle also serves to eliminate the change in the flexing cycle which would be caused by permanent set if the test involved only tension. Thus the testing machine of the invention is designed to produce, with a simple test piece, a flexing cycle comprising both tension and compression. The maximum tension imparted by the apparatus is increased somewhat over that normally encountered in a tire to reduce the flexing time to a reasonable value.

The chief objects of the invention are to provide an improved method and laboratory apparatus for evaluating the groove-cracking resistance of various natural and/or synthetic rubber compositions; to provide apparatus of the character mentioned that is controllable, that is rapid, and that is relatively inexpensive; to provide apparatus that will test both groove shape and rubber compounds; and to provide testing apparatus producing results that correlate with actual service results. Other objects will be manifest as the description proceeds.

Of the accompanying drawings:

Fig. 6 is a front elevation of a modified embodiment of the invention;

Fig. 7 is a side elevation thereof;

Fig. 8 is a fragmentary side elevational detail of the main supporting plate of the structure of Fig. 7, showing means for adjusting the fulcrum of the movable work-holding jaw; and Fig. 9 is a section of a modified work-holding jaw, the position of the work-piece when under tension, neutral, and compressive strains being indicated.

Figure 1:
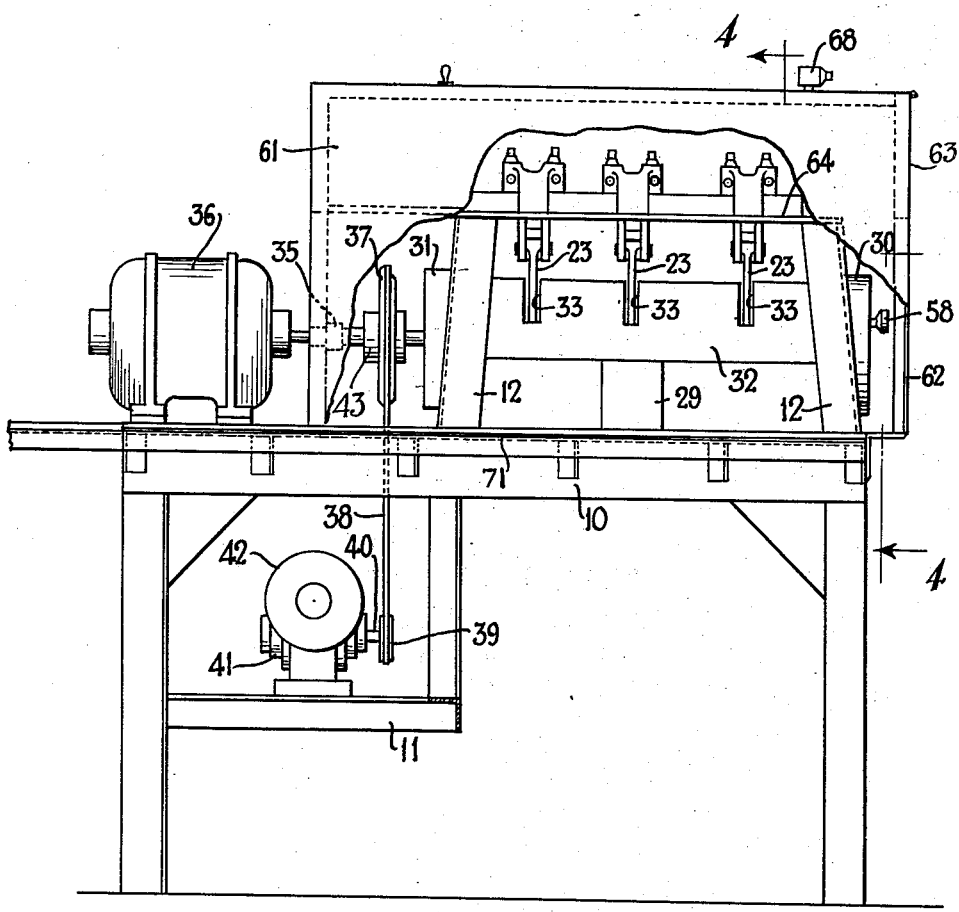
Fig. 1 is a side elevation of testing apparatus embodying the invention, a part being broken away for clarity of illustration.

Referring to Figs. 1 to 5 of the drawings, there is shown a testing apparatus comprising a table-like supporting structure 10 having a shelf 11 located below the top and at one end thereof. Mounted atop the structure 10, is a frame structure comprising substantially identical, spaced apart end-brackets 12, 12, and connecting said end-brackets and supported thereby, at the top thereof, is a horizontal shelf consisting of angle irons 13, 13 arranged back-to-back and welded or otherwise secured to each other. Mounted on the top of said horizontal shelf is a plurality of stationary work-holding jaws each designated as a whole by the numeral 14. Said jaws are of identical construction, and in the apparatus illustrated, are six in number. The position of adjacent jaws 14, on top of the shelf, is reversed, that is, alternate jaws face in one direction and intermediate jaws face in the opposite direction, as is most clearly shown in Fig. 4. In order to increase the capacity of the aparatus, each work-holding jaw is of dual construction; that is, it is capable of engaging two work-units arranged in side by side relation.

Operatively associated with each work-holding jaw 14 is a movable work-holding jaw that is designated as a whole by the numeral 16, each of said movable jaws being of dual type. Each jaw 16 comprises two integral, parallel, spaced-apart, plate-like supporting structures 17 that are vertically disposed, and are pivotally mounted upon a pivot-shaft 18, the latter being mounted in bracket blocks 19, 19 that are welded to the angle irons 13, in the angles thereof. It will be observed that the pivot-shafts 18, which constitute the fulcrums of the movable jaws 16, are offset an appreciable distance from both the movable jaws and the stationary jaws, being disposed directly below the latter. The bracket blocks 19 are arranged in pairs, of which there are three on each side of the shelf that supports the stationary jaws 14, and serve also to position the movable jaw structures 16 in alignment with their companion stationary jaw structures 14, transversely of the apparatus. Integrally formed on each plate-like member 17 of each movable jaw structure 16 is an arcuate, downwardly extending ear 20, there being two such ears to each jaw structure. The ears 20 of each jaw structure are parallel and in spaced-apart relation, and each is formed with an arcuate series of apertures 21, 21; the apertures in the two ears being in axial alignment. Each pair of apertures 21 is arranged selectively to receive a pivot pin 22 to which one end of a connecting rod 23 is pivotally attached, the end of the connecting rod 23 being positioned between said ears 20. The other end of said connecting rod 23 is pivotally mounted upon an eccentric portion 25 of a crank shaft 24; the arrangement being such that rotation of the crank shaft will effect oscillation of the movable jaw structure so as to move the jaw 16 periodically toward and away from its companion stationary jaw 14. The amplitude of such movement may be altered a determinate extent by other apertures 21 in the movable jaw structures for connecting the latter to the connecting rods 23.

The shaft 24 is formed with six of the eccentric portions 25, and the latter are arranged at spaced-apart regions longitudinally of the shaft so that the respective connecting rods 23 may be mounted thereon. Spacer members 26 are clamped upon the shaft 24, intermediate the connecting rods 23, to restrain the latter against movement longitudinally of the shaft. All the eccentric portions 25 have the same extent of eccentricity with relation to the axis of shaft 24, but their axes are angularly offset from each other about the axis of said shaft so that the several movable jaw structures 16 are oscillated in succession and excessive vibration of the apparatus is obviated. The shaft 24 is journaled at one end in a bearing structure 26 that is mounted in one of the brackets 12, and adjacent its other end is journaled in a substantially identical bearing structure 27 that is mounted in the other bracket 12. Intermediate bearing structures 26, 27, the shaft is centrally journaled in a bearing bracket 28 that is mounted upon a suitable support 29 that rests upon the table 10. The end of the shaft that projects beyond bearing 26 is provided with a flywheel 30, and a second flywheel 31 is mounted upon the end portion of the shaft that projects beyond bearing 27. Between the brackets 12 the shaft 24 is enclosed in a sheet metal housing 32, which housing is formed with a plurality of slots 33 in the top thereof to enable the respective connecting rods 23 to extend therethrough. The housing 32 protects other elements of the apparatus from lubricant that may be thrown off from the shaft 24.

The shaft 24 is arranged to be driven at relatively high speed, and on occasion, to be driven at relatively slow speed for a reason subsequently to be explained. For driving the shaft at high speed, the end thereof beyond bearing 27 is coupled at 35 directly to the shaft of an electric motor 36, the latter being mounted upon the top of the table structure 10. For driving the shaft at relatively slow speed, a pulley 37 is operatively mounted upon the shaft, between flywheel 31 and coupling 35, through the agency of an overrunning clutch 43 of any known or preferred design. A side-driving transmission belt 38 is trained about said pulley 37 and about a smaller pulley 39 that is mounted upon the driving shaft 40 of speed reducing device 41. The latter is mounted upon the shelf 11 of the table structure 10 and is driven by an electric motor 42.

Figure 2:
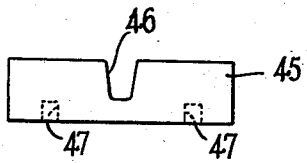
Fig. 2 is a side elevation of a test piece such as is used with the apparatus.
Figure 3:
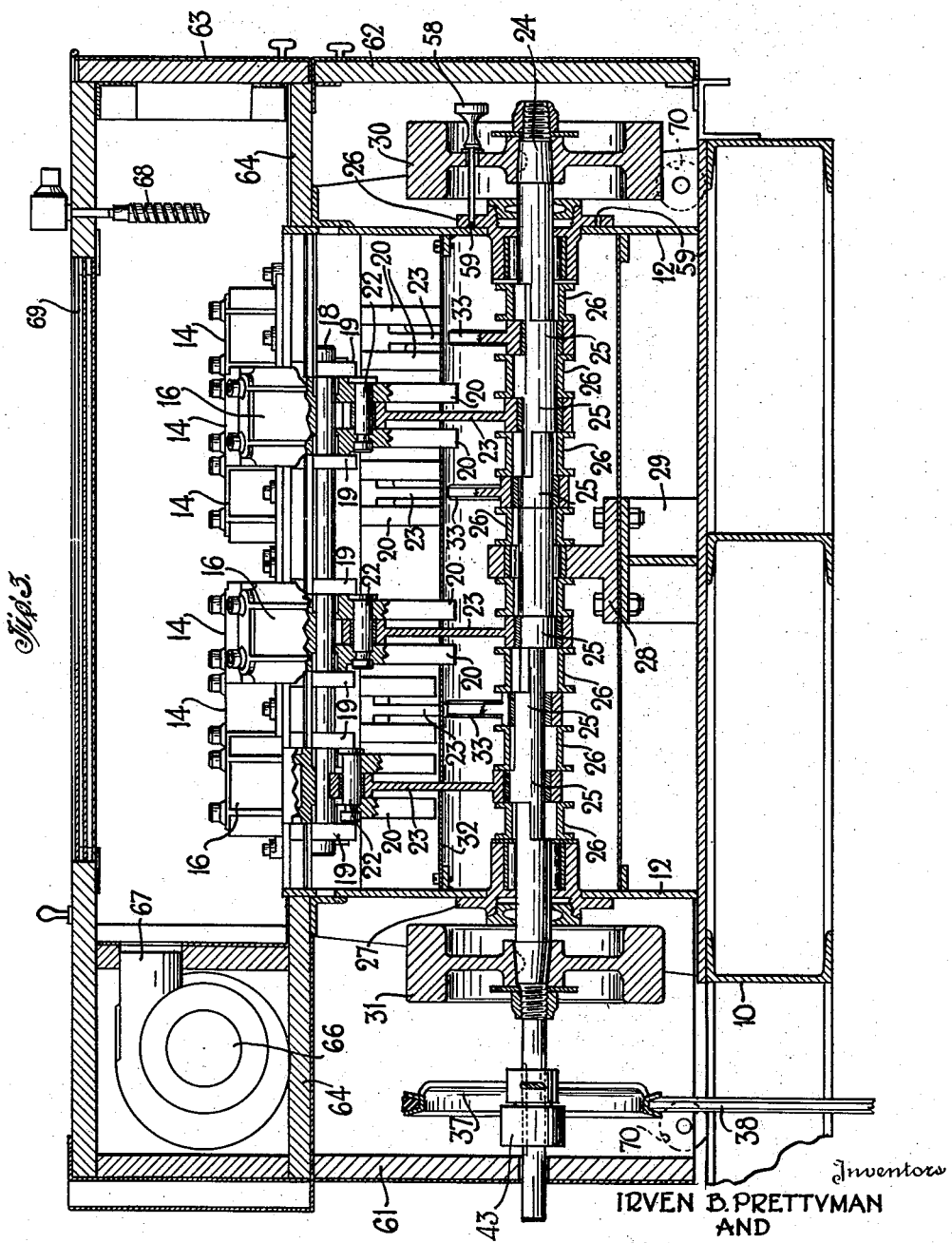
Fig. 3 is a vertical longitudinal section, on a larger scale, through the operative portion of the apparatus, the power elements and their support being omitted.

A test sample or work-piece such as is used in the apparatus is shown in side elevation at 45, Fig. 2. The sample 45 is composed of vulcanized rubber composition, and is a rectangular block having a transverse groove 46 in its top face, and two cylindrical recesses or sockets 47, 47 symmetrically disposed in its bottom face, on opposite sides of the central plane of the groove 46. The samples 45 may be produced in molds prepared for that purpose, or they may be prepared either from new or from slightly worn treads of tire casings. In either case it is essential that the dimensions of the samples be held to determinate gauge within extremely small tolerances. The apparatus is designed to evaluate qualitatively the resistance of various rubber compositions to flex cracking within a groove, such as the groove 46. The apparatus also is adapted to evaluate the resistance of various stocks to crack growth, and when only the latter value is sought, an incision is made centrally in the bottom of the groove before the test is begun. For making the incision a special knife and guide block are utilized so as to insure uniformity of incision in the several test pieces. In practice, incisions of $7/32$ in. length and $3/64$ in. depth have produced satisfactory results. In testing for crack initiation the time required for groove-cracks to appear in the various samples is noted and compared. In testing for crack growth the test may be run for a determinate length of time and then the length of the cracks in the various samples noted and compared, or, the test may be run until the cracks in one or more of the samples have grown to a determinate length, and the elapsed time noted.

Figure 5:
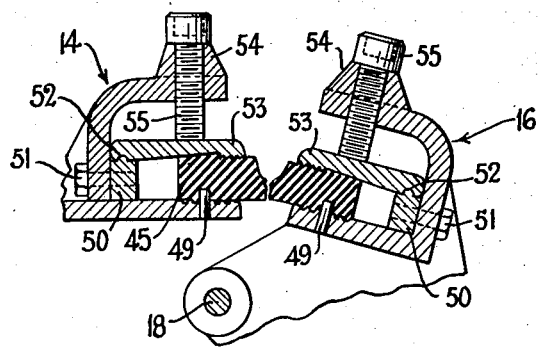
Fig. 5 is a vertical section through the work-holding jaws, and the work therein, showing the latter in condition of complete failure.

Each test sample 45 is mounted in the apparatus by being engaged by a stationary work-holding jaw 14 and a movable work-holding jaw 16, attention being directed to Fig. 5 of the drawings wherein the said jaws are shown in greater detail. The jaws 14, 16 are identical with each other in the elements thereof that engage the test sample. Thus each comprises a generally C-shaped structure, the bottom jaw of which is transversely serrated as shown, and has a stud or dowel 49 projecting upwardly therefrom, said dowel being of such size as to be receivable in a recess 47 of a test sample 45 with a sliding fit. Located within and at the rear of each work-holding jaw is a fulcrum block 50 secured in place by set screws such as shown at 51. The top of each block 50 is formed with a longitudinally extending rib 52 that constitutes a fulcrum for a movable clamp 53 that has one end formed with a groove that rests upon said rib 52. The other end of said clamp 53 has a knurled or serrated under-face adapted to engage a test sample 45 that is positioned between the clamp and the bottom jaw element. The upper element of each jaw structure has a boss 54 formed on the top thereof, and threaded through said boss and upper jaw element is a cap screw 55 adapted to bear against the top face of the clamp 53 to urge the free end of the latter against the test sample. It is important that the various work-holding jaws be machined accurately to proper dimensions, since it is by means of these jaws that compressive stress is applied to the test samples, which stress must be uniform throughout the several samples to produce comparable results. Thus it is important that the height of the bosses 54 and the length of the threaded portions of screws 55 be accurately to gauge, since this enables the screws to be turned down until their heads abut the respective bosses 54 as a simple means for applying determinate uniform pressure to the several test samples. Under compressive stress such as is applied to the test sample by the apparatus, the groove 46 of the sample closes somewhat, and the sample is otherwise somewhat deformed as indicated by the dot and dash outline A shown in Fig. 9 of the drawings. It will be understood that each of the jaws 14, 16 is a dual structure arranged to hold two test samples, and that the clamps 53, cap screws 55 and bosses 54 shown in Fig. 5 are duplicated in each of the jaw structures shown in said figure, by identical elements arranged beside them.

As previously stated, compressive stress is applied to the test samples solely by the clamping pressure thereon whereby they are secured in the jaws 14, 16. Tension is applied to the test samples when the movable jaw is moved away from the stationary jaw by induced oscillation of said movable jaw. There is a position of the movable jaw wherein the test sample is passing from compression to tension, or from tension to compression, and is under zero or neutral strain, the position of the sample at such time being indicated by the full line profile B of Fig. 9. The dotted line profile C shows the sample in a typical position while under tension.

A test sample 45 is mounted in the apparatus so as initially to be under compressive stress. This requires that the sample be mounted while the work-holding jaws 14, 16 are in closest proximity to each other, which occurs only when the eccentric portions 25 of the crank 24 are in position to exert maximum throw of the connecting rods 23. This is the position of the jaws 14, 16 at the left hand side of Fig. 4. To assure that the shaft 24 will be in proper angular position for mounting test samples in the respective jaws, means is provided for holding the shaft in determinate angular position. Such means comprises a manually operable slide-bolt 58 that is carried by the flywheel 30, and is receivable selectively in any one of a circumferential series of bores or recesses 59 formed in the bearing structure 26. The slide bolt 58 normally is in retracted position, out of engagement with the recesses 59 so that the shaft 24 may rotate to flex the test samples. The recesses 59 and the slide bolt 58 are so positioned with relation to the eccentrics 25 that when the slide bolt is engaged with one of the recesses, a particular movable jaw 16 is in position of closest proximity to its companion stationary jaw 14.

The entire structure described, except the motor 36, that is mounted upon the top of table 10 is enclosed in a housing 61 composed principally of heat-insulating material. Said housing has a door 62 at one end thereof to give access to the flywheel 30, said door being hinged at its bottom to the table 10. Above door 62 is a door 63 hinged to the top wall of the housing. The opposite end wall of the housing is fixedly mounted, and the remainder of the housing is separable therefrom. The side walls of the housing are provided with casters or rollers 70 that run on rails 71 that are mounted on each side of table 10. The arrangement is such that sides and top of the housing may be moved sufficiently beyond an end of the apparatus to give access to the work holding jaws to enable the mounting and demounting of the test samples 45. There is a horizontally arranged partition 64 that divides the housing into an upper and lower chamber, said partition being located substantially at the top of the brackets 12. The arrangement is such that the test samples and the work-holding jaws are located in the upper chamber. In order that the samples 45 may be tested under conditions similar to actual road service, it is desirable that they be heated, and to this end a hot-air blower 66 is located in one end of the upper chamber and discharges hot air thereinto from nozzles 67, 67. The air for blower 66 is heated in any desired or preferred manner. A thermostat 68 carried by the top wall of the housing and extending into the upper chamber remote from the nozzles 67 is provided for regulating the blower to assure controlled heat within said upper chamber. The top of the housing has a glass panel 69 therein, through which panel the progress of a test may be observed. The panel 19 consists of a plurality of panes of glass with dead air spaces between adjacent panes to reduce heat loss therethrough.

In the operation of the apparatus, the test samples 45 are mounted therein one at a time.

Figure 4:
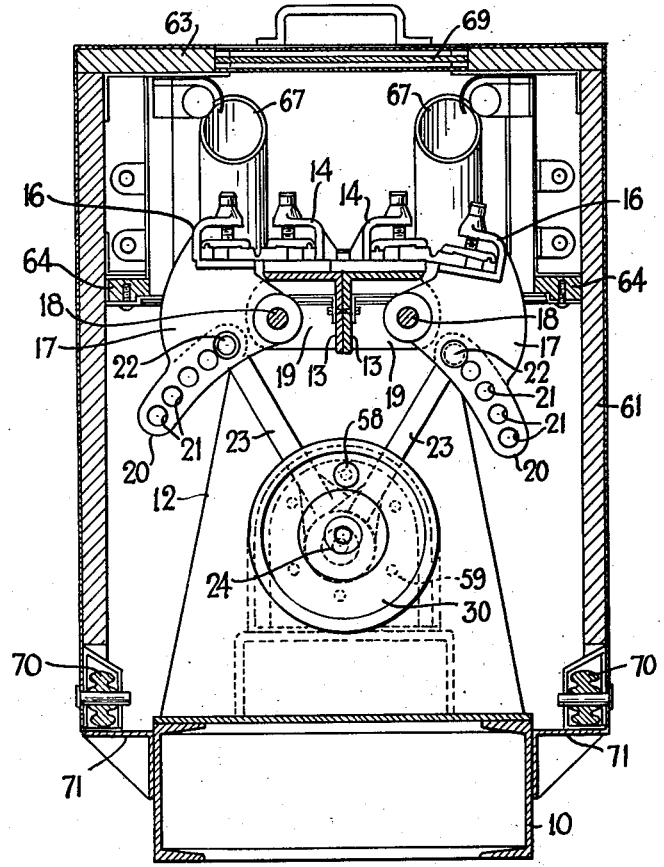
Fig. 4 is a transverse section of the apparatus substantially on the line 4—4 of Fig. 1.

The test unit being loaded has its holding jaws 14, 16 disposed in closest proximity to each other, and this is readily effected by securing the shaft 24 in proper angular position by means of the slide bolt 58 in flywheel 30. Each test sample is positioned over dowel pins 49 in the respective jaws 14, 16. The set screws 55 are then turned down with alternate quarter turns to their fullest extent, that is, until their heads abut the bosses 54 of the respective holding jaws. The screws 55 force the clamps 53 down upon the test samples, and put the latter under compressive stress. In the construction shown in Fig. 5 of the drawings, the compression amounted to 43% in the bottom of the grooves 46 of the samples. Two samples are mounted in each test unit of the apparatus, the angular position of the shaft 24 being changed with the loading of the respective units to bring the jaws thereof to closest proximity. In Fig. 4 the connecting rods 23 are shown connected to the movable jaw structures at a point nearest the fulcrum or pivot 18 thereof, the arrangement being such as to impart the maximum amplitude of oscillation to the movable jaws. By inserting the pivot pin 22 in different apertures 21 of the jaw structures, different flexing cycles may be obtained, that is, the distance that the movable jaw moves away from the stationary jaw may be varied, whereby the maximum tension imparted to the test samples is varied. In the apparatus herein illustrated, the said tension may be varied between maximums of 93.0% and 21.5%. However, in all settings of the pivot pins 22, the movable jaws 16 never approach closer to the stationary jaws 14 than the position of the initial setting, with the result that the compressive force upon the test samples is constant and uniform throughout a testing cycle. The testing cycles of the apparatus were selected to give reasonable testing times for all types of tread stocks, both natural and synthetic.

After all test samples are mounted as described, the housing 61 is closed, the hot air blower is set in operation, and the shaft 24 is rotated by means of the motor 42 that operates through the speed reducing device 41. The motor 42 drives the shaft 24 at the relatively slow speed of about 57 R. P. M., during the period required to bring the temperature within the housing up to that desired. This assures equal conditioning of all samples, and obviates permanent set such as is likely to occur when samples are maintained at a constant deformation for an extended length of time before being fully heated. After the temperature in the housing reaches the desired maximum, operation of motor 42 is discontinued and the shaft 24 thereafter is driven by the motor 36, which rotates the shaft at about 1160 R. P. M. Usually the test continues for such time as is necessary to produce a selected degree of cracking. In some cases, however, the test is run for a definite length of time, the extent of cracking of the various samples thereafter being computed and compared. If desired, the test may run until one or more of the samples is completely broken, as shown in Fig. 5.

As will be evident from the showing of Fig. 9, the test samples undergo period strains varying from compression, through neutral to tension, thus approximating quantitatively the strains imposed upon a tire under service conditions. The various functions of the apparatus are controllable, the operation of the apparatus is rapid, and it achieves the other advantages set out in the foregoing statement of objects.

A somewhat modified embodiment of the invention is shown in Figs. 6 through 8 of the drawings, which embodiment is of smaller capacity adapted for the concurrent testing of but two samples. As shown, the modified apparatus comprises a base plate 72 having a supporting plate or frame 73 mounted thereon and rising perpendicular thereto. Mounted upon opposite sides of the frame 73 and projecting laterally therefrom are respective stationary work-holding jaws 74. Beneath the latter the frame is formed with a slot 75, Fig. 8, in which a pivot pin 76 is adjustably positioned. An L-shaped rocker structure 77 has leg portions 78, 78 that straddle the frame 73 and are formed with respective slots 79 that are parallel to each other and in which the opposite ends of the pivot pin 76 are receivable. The rocker structure 77 also has upwardly extending leg portions that carry respective laterally extending work-holding jaws 80 thereon, which jaws are aligned with respective stationary work-holding jaws 74 to enable the mounting of test samples therebetween, in the same manner as in the previously described embodiment of the invention. Pivotally connected to the rocker structure 77 at 81, at the elbow of said structure, is a sectional connecting rod 82, the other end of which is pivotally connected at 83 to a member 84 that is adjustably mounted in a diametric slot 85 in a rotary member 86. The arrangement is such that by adjusting the position of the member 84 longitudinally of its slot 85, the eccentricity of the pivot 83 with relation to the axis of rotation of the member 86 may be infinitely varied within determinate limits. The member 86 is mounted on one end of an axial shaft 87 that is journaled in bearing brackets 88 and has its other end coupled to the shaft of an electric motor 89. The sectional feature of the connecting rod 82 enables the length thereof to be adjusted as required by the other adjustable features of this embodiment of the invention.

Each of the jaw members 74, 80 includes a clamping plate 91 that is interposed between the jaws thereof and upon an end portion of a test sample 92, also interposed between said jaws. A set screw 93 is threaded through the upper portion of each jaw and into engagement with the clamping plate 91 for urging the latter against the test sample and thereby to put the latter under compressive stress. The test samples 92 are substantially similar to the samples 45 hereinbefore described, but are not provided with recesses in the bottom thereof for receiving registering dowels.

In operation, driving of the motor 89 rotates shaft 87 and member 86, thereby operating connecting rod 82 to oscillate rocker structure 77 and jaws 80 thereon to impart tensional strains upon the test samples 92. The latter, when mounted, are under compressive stress, as in the previously described embodiment. By shifting the pivot point 83 relatively of the rotary member 86, the maximum tension applied to the sample may be varied infinitely within determinate limits. By altering the length of the connecting rod 82, the initial compressive stress on the test samples may be maintained constant notwithstanding variations in the throw of the connecting rod. By shifting the pivot pin 76 rearwardly, to the right as viewed in Fig. 7, the oscillation of the movable jaws 80 will impart shearing strain upon the samples 92.

This embodiment of the invention does not include all of the features of the first described embodiment, and does not have the capacity of the latter, but it is capable of finer adjustment of tension-imparting means, and is capable of applying shearing strain, which may be desirable in some circumstances.

In Fig. 9 is shown another embodiment of the work-holding jaw whereof the jaw member 95 includes a fulcrum block 96 having a clamping member 97 fulcrumed at one end thereon, the other end of the clamping member being arranged to engage the top of one end portion of a test sample. A set screw 98 threaded through the top of the jaw structure 95 engages the clamping member 97 for urging it against the sample. As in the jaw construction shown in Fig. 7, accurate measuring is required to assure that the compressive stress applied to the test samples is of proper magnitude, and is the same in other samples concurrently being tested.

Other modification may be resorted to without departing from the spirit of the invention, or the scope thereof as defined by the appended claims.

What is claimed is:

1. In testing apparatus of the character described, the combination of a pair of work-holding jaws adapted to grip an elastic test sample positioned therebetween, one of said jaws having a fixed situs, means for oscillating the other jaw toward and away from the fixed jaw about an axis that is offset an appreciable distance laterally of the fixed jaw to impart tension to the test sample, and means for varying the distance that the movable jaw moves away from the fixed jaw while the distance separating the jaws when they are nearest each other remains constant.

2. A combination as defined in claim 1 wherein the last mentioned means comprises a connecting rod and means for reciprocating the same, and means for connecting the connecting rod to different points on the movable jaw structure to change the amplitude of oscillation of the latter.

3. In testing apparatus for elastic test samples, the combination of a plurality of stationary work-holding jaws, a plurality of companion movable work-holding jaws opposed to the respective stationary jaws, fulcrums for the respective movable jaws, connecting rods pivotally connected to the movable jaws and adapted to oscillate them upon their fulcrums, a shaft and means for driving the same, and a plurality of eccentrics on said shaft having operative engagement with said connecting rods, said eccentrics being arranged in angularly offset relation to each other about the shaft so that the movable jaw structures oscillate in succession and excessive vibration of the apparatus is avoided.

4. A combination as defined in claim 3 including means for locking the shaft non-rotatably in selective determinate angular positions to enable test samples to be mounted in opposed jaws while said jaws are in closest proximity to each other.

5. A combination as defined in claim 3 including bearing structures for the shaft, a flywheel on the shaft adjacent one of the bearing structures, and a slide bolt carried by the flywheel and engageable alternatively in any of a circumferential series of recesses formed in the adjacent bearing structure, said slide bolt and said recesses being determinately positioned with relation to the eccentrics of the shaft so that when the slide bolt is engaged in a recess in the bearing structure one of the eccentrics will be holding one of the movable jaws in its closest proximity to its companion stationary jaw.

6. In testing apparatus of the character described, the combination of a pair of opposed work-holding jaws constructed and arranged to clamp opposite end portions of an elastic test sample therebetween and thereby to apply determinate compressive stress to said sample, one of said jaws having a fixed situs and the other having a pivotal mounting to enable oscillation of the jaw to and from the fixed jaw to impart tension to the test sample, a connecting rod of adjustable length pivotally connected to the movable jaw for oscillating the same, a rotary eccentric connected to the connecting rod, means for varying the eccentricity of the eccentric to vary the amplitude of oscillatory movement of the movable jaw, and means for altering the position of the pivot of the movable jaw with relation to the position of the fixed jaw.

7. The method of testing cracking resistance of tire tread stock which comprises applying lateral gripping pressure of progressively increasing magnitude to opposite end portions of a test sample of the stock to place the medial region of the sample under determinate compressive stress, and then periodically stretching said test sample to an extent that replaces said compressive stress with tensile stress.

8. A combination as defined in claim 7 wherein the stretching of the test sample is effected by moving one end portion thereof in an arcuate course away from the other end portion, whereby the stresses imposed upon a tire tread in service are simulated.

9. The method of testing cracking resistance of tire tread stock which comprises positioning the end portions of a test sample of the stock a fixed distance apart, applying lateral compacting pressure locally to the sample, at the opposite end portions thereof while said end portions retain their fixed distance apart whereby deformation of the end portions of the test sample resulting from said pressure places the medial region of the sample under compressive stress, and then periodically elongating the sample and thereafter restoring it to initial position whereby the sample passes through successive cycles consisting of determinate tensile stress, neutral stress, and initial compressive stress.

IRVEN B. PRETTYMAN.
HANS G. HAGER.

REFERENCES CITED

The following references are of record in the file of this patent:

UNITED STATES PATENTS

| Number | Name | Date |
| --- | --- | --- |
| 682,785 | Caldwell | Sept. 17, 1901 |
| 1,458,259 | Wille | June 12, 1923 |
| 1,512,063 | Sproull | Oct. 21, 1924 |
| 1,518,790 | Hecht et al. | Dec. 9, 1924 |
| 1,559,466 | Schopper | Oct. 27, 1925 |
| 2,157,092 | Allen et al. | May 9, 1939 |
| 2,215,958 | Fullerton | Sept. 24, 1940 |
| 2,228,593 | Dibble et al. | Jan. 14, 1941 |
| 2,380,990 | Paul | Aug. 7, 1945 |

FOREIGN PATENTS

| Number | Country | Date |
| --- | --- | --- |
| 493,268 | Great Britain | Oct. 5, 1938 |